(12) United States Patent
Ward et al.

(10) Patent No.: US 8,781,870 B2
(45) Date of Patent: Jul. 15, 2014

(54) PERSONAL INFORMATION MANAGEMENT WITH LOCATION FUNCTIONALITY

(75) Inventors: Bradley W. Ward, Seattle, WA (US); David Lee, Sammamish, WA (US); Martin H. Hall, Sammamish, WA (US); Mark McNulty, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 12/464,018

(22) Filed: May 11, 2009

(65) Prior Publication Data

US 2010/0287024 A1    Nov. 11, 2010

(51) Int. Cl.
*G06Q 10/00*    (2012.01)

(52) U.S. Cl.
USPC ........................................................ 705/7.13

(58) Field of Classification Search
None
See application file for complete search history.

(56) References Cited

U.S. PATENT DOCUMENTS

| | | |
|---|---|---|
| 6,477,374 B1 | 11/2002 | Shaffer et al. |
| 7,752,188 B2 * | 7/2010 | Lagerstedt et al. ........... 707/705 |
| 2006/0218029 A1 | 9/2006 | Chin |
| 2007/0055561 A1 * | 3/2007 | Perrella et al. ................... 705/9 |
| 2008/0086455 A1 * | 4/2008 | Meisels et al. ................... 707/3 |
| 2008/0195312 A1 * | 8/2008 | Aaron et al. ................. 701/209 |
| 2008/0319652 A1 | 12/2008 | Moshfeghi |
| 2009/0006994 A1 | 1/2009 | Forstall et al. |
| 2009/0036148 A1 * | 2/2009 | Yach ............................. 455/457 |
| 2009/0164110 A1 * | 6/2009 | Basir ............................ 701/117 |
| 2009/0239552 A1 * | 9/2009 | Churchill et al. .......... 455/456.3 |

OTHER PUBLICATIONS

"Use GPS and Web Maps for Location-Aware Apps", Retrieved at <<http://msdn.microsoft.com/en-us/magazine/2009.01.wm6gps.aspx>>, Feb. 10, 2009, pp. 6.

"GPS software for cell phones, update Nov. 2008", Retrieved at <<http://www.gps-practice-and-fun.com/gps-software-for-cell-phones-update.html, Feb. 10, 2009, pp. 6.

* cited by examiner

*Primary Examiner* — Paul Danneman
(74) *Attorney, Agent, or Firm* — John Jardine; Andrew Sanders; Micky Minhas

(57) ABSTRACT

A method is provided for prompting a user to perform PIM-related acts based on dynamic location data. The user's current location is received and a PIM item is selected from the user's PIM system. The user's current location is compared to the location of the selected PIM item. Based on the comparison, a suggested user fulfillment action for the PIM item is suggested to the user.

13 Claims, 5 Drawing Sheets

PERSONAL INFORMATION MANAGEMENT WITH LOCATION FUNCTIONALITY

BACKGROUND

Personal information management (PIM) systems are widely employed for personal and professional use. Increasingly, individuals access these systems from a variety of locations using a variety of devices. The data in a PIM system will often include location information—messages specifying where meetings are to occur, calendared appointments with designated locations, tasks to occur at specific locations, addresses associated with contacts, etc. Furthermore, there is an increasing array of navigation and other location tools that allow a user to determine their location (e.g., on a map) in real time. Because location information can take so many forms and come from diverse sources, it can be challenging for a PIM system user to effectively make productive use of location information.

SUMMARY

Accordingly, the present description provides a method of prompting a user to perform PIM-related acts based on dynamic location data. The method includes receiving a current location of the user and selecting a PIM item from the user's system having an associated location. The user's current location is compared to the location of the PIM item. Based on the comparison, a suggested user fulfillment action for the PIM item is suggested to the user. The description further provides a method for identifying, for a calendar item of the user, other items in the user's PIM system having information of potential relevance to the location (e.g., meeting location) of the calendar item.

The above Summary is provided to introduce a selection of concepts in a simplified form that are further described below in the Detailed Description. This Summary is not intended to identify key features or essential features of the claimed subject matter, nor is it intended to limit the scope of the claimed subject matter. Furthermore, the claimed subject matter is not limited to implementations that solve any or all disadvantages noted in any part of this disclosure.

DETAILED DESCRIPTION

Figure 1:
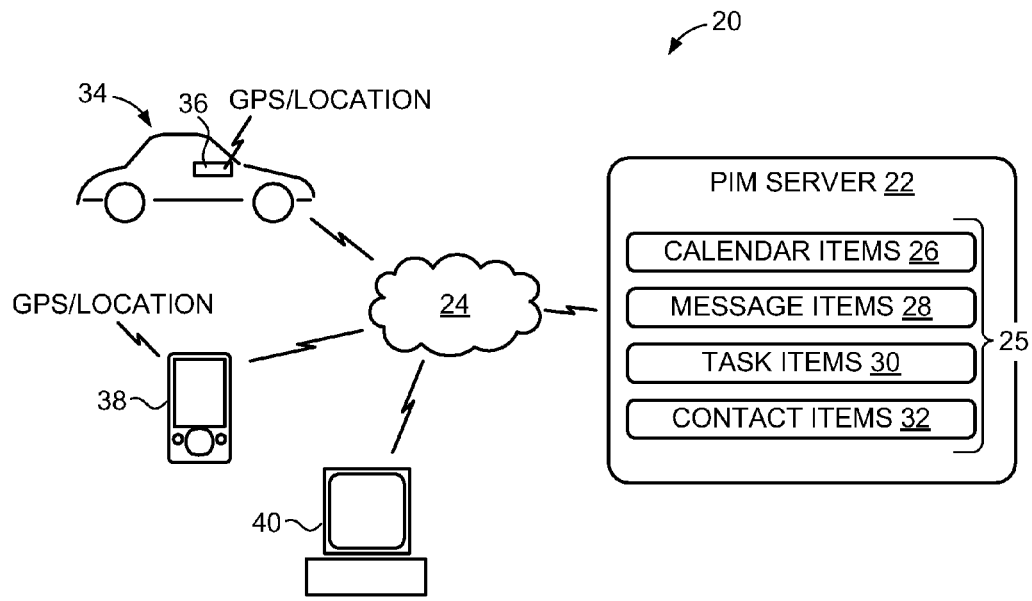
FIG. 1 is a schematic depiction of a personal information management (PIM) system with integrated location functionality.

FIG. 1 schematically depicts an embodiment of a system 20 according to the present description, in which integration may be provided between a personal information management (PIM) platform and a navigation system or other location-enabled device. System 20 may include a PIM server 22 operatively interconnected (e.g., via network 24) with various other devices used to access PIM items 25 contained on PIM server 22, which may include, for one or more users, calendar items 26, message items 28 (e.g., email messages), task items 30 and/or contact items 32.

Microsoft Exchange Server is an example of a commercially available product that may be used to implement PIM server 22, though any suitable PIM platform may be employed. In many cases, the PIM server will be configured to actively synchronize with and/or to "push" PIM items out to a client device, such as a mobile phone or a vehicle navigation system. Furthermore, standalone PIM applications may be employed in addition to or instead of the client/server arrangement depicted in FIG. 1.

FIG. 1 also shows various devices that may be used to access PIM items from, and otherwise interact with, PIM server 22. In particular, vehicle 34 includes an in-dash navigation system 36 having PIM functionality for interacting with PIM server 22. Also shown is a location-enabled portable device 38, which may be a mobile phone, smart phone, portable navigation device, personal digital assistant, media-playing device, etc. with PIM functionality. As indicated in the figure, both navigation system 36 and portable device 38 are configured to receive location data, which may be GPS data received via one or more satellites. Though many the examples discussed herein will involve a location enabled-device, some embodiments may be implemented in connection with devices that do not have location-sensing ability, such as desktop computer 40.

Figure 2:
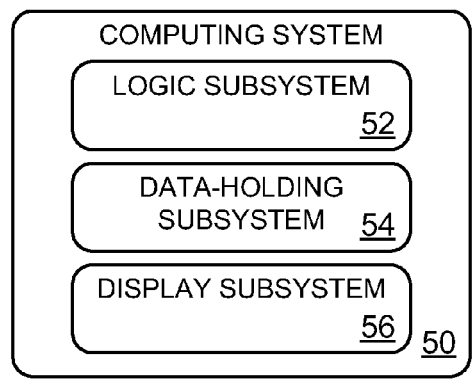
FIG. 2 is a schematic depiction of an exemplary computing device which may be used in connection with the system of FIG. 1.

FIG. 2 depicts an example computing system 50, which depicts a general implementation that may be employed for any of the interconnected computing devices of FIG. 1. Computing system 50 includes a logic subsystem 52 which may include one or more physical devices configured to execute one or more instructions to carry out the location-aware PIM functionality described herein. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Computing system 50 also includes a data-holding subsystem 54, which may include one or more physical devices configured to hold data and/or instructions executable by a logic subsystem to implement the location-aware PIM methods and processes described herein. For example, data-holding subsystem 54 may hold PIM items and software applications for interacting with the PIM items. When location-aware PIM methods and processes described herein are implemented, the state of the data-holding subsystem may be transformed (e.g., to hold different data). The data-holding subsystem may include removable media and/or built-in devices. The data-holding subsystem may include optical memory devices, semiconductor memory devices, and/or magnetic memory devices, among others. The data-holding subsystem may include devices with one or more of the following characteristics: volatile, nonvolatile, dynamic, static, read/write, read-only, random access, sequential access, location addressable, file addressable, and content addressable. In some embodiments, a logic subsystem and data-holding subsystem may be integrated into one or more common devices, such as an application specific integrated circuit or a system on a chip.

A display subsystem 56 may also be provided, for example to display a calendar view, contacts list, etc. in a PIM application, or to otherwise provide visual output. More generally, when employed, a display subsystem may be used to present a visual representation of data held by a data-holding subsystem. As the herein described methods and processes change stored data, and thus transform the state of the data-holding subsystem, the state of the display subsystem may likewise be transformed to visually represent changes in the underlying data. The display subsystem may include one or more display devices utilizing virtually any type of technology. Such display devices may be combined with a logic subsystem and/or a data-holding subsystem in a shared enclosure, or such display devices may be peripheral display devices.

FIGS. 3-7 depict various exemplary methods for using location information in connection with a PIM system. In the description of these exemplary methods, various references may be made to FIGS. 1 and 2. It should be appreciated, however, that these references are examples, and that the described methods may be employed in connection systems and components other than those shown in FIGS. 1 and 2.

Figure 3:
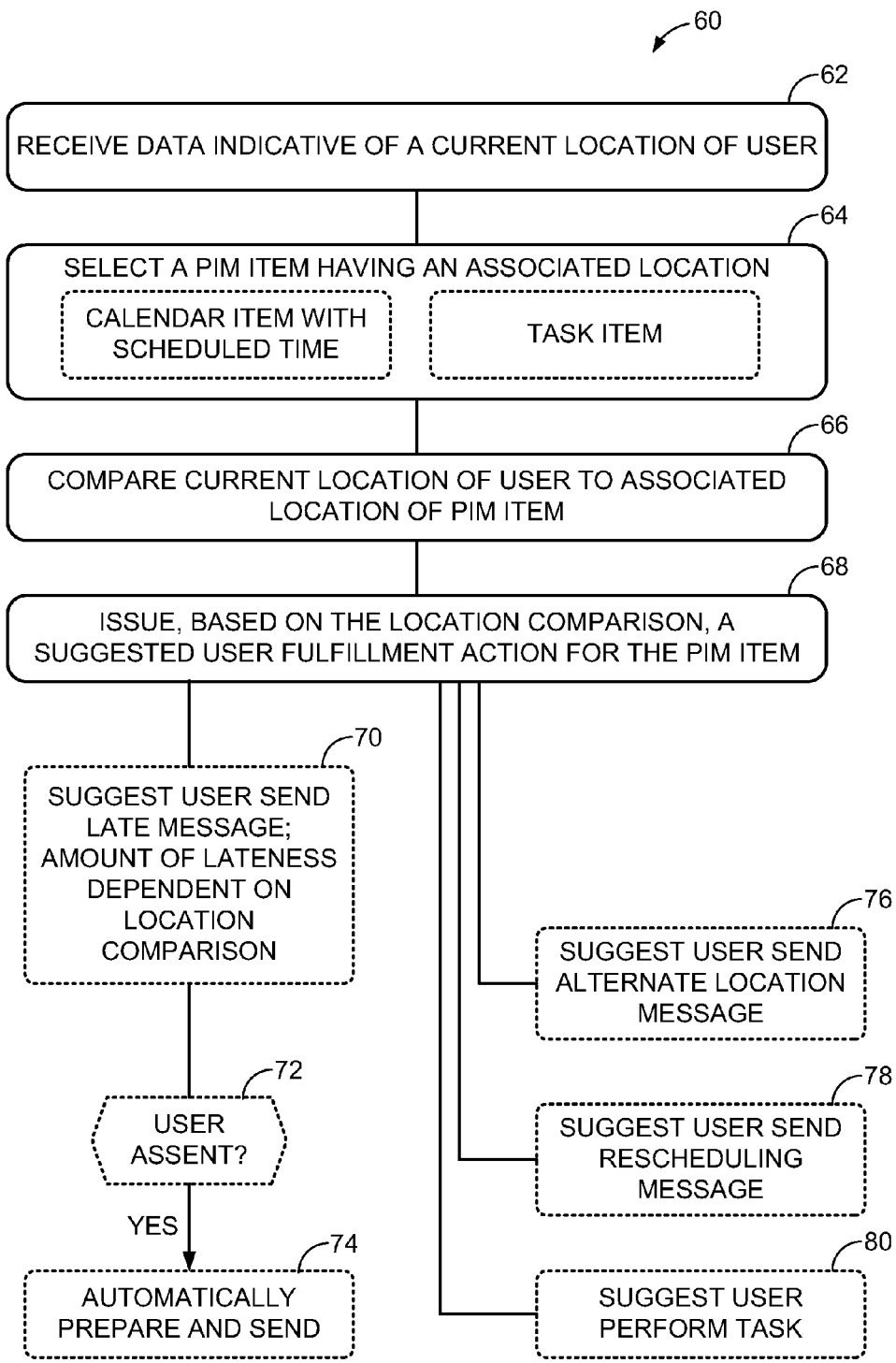
FIG. 3 depicts an exemplary method for prompting user PIM actions based on dynamic location information.

Referring now to FIG. 3, the figure depicts an exemplary method 60 for prompting a user to perform PIM-related acts based on dynamic location data. As shown at step 62, the method may include receiving data indicative of a current location of the user. The location may be determined using GPS data, for example, such as GPS data received via in-dash navigation system 36 or portable device 38 (FIG. 1). However, other location-sensing methods may be employed in addition to or instead of GPS data.

Continuing with FIG. 3, method 60 may further include selecting, from the PIM system of the user, a PIM item having an associated location (step 64); comparing the current location of the user to the location of the selected PIM item (step 66); and issuing, based on the location comparison, a suggested user fulfillment action for the selected PIM item (step 68).

Referring to step 64, the PIM item is selected from the data store containing the user's PIM information. In the example of FIG. 1, if the user were in vehicle 34, the in-dash navigation system 36 could retrieve the user's PIM items from PIM server 22, via a push operation or other transmission. Alternatively, the PIM item could be retrieved via portable device 38 or any other device that the user employs to interact with PIM items.

As further shown at step 64, the selected PIM item may be a calendar item having a scheduled time. Indeed, the exemplary method can be applied in connection with a meeting occurring in the near future. For example, at 9:30 a.m., the user might be driving in their car en route to a meeting that is scheduled to begin at 10:00 a.m. In such a situation, method 60 may include prompting the user to send a pre-created message in certain circumstances.

For example, as shown at step 70, the suggested user fulfillment action may be to send a message indicating the user will be late to the appointment. Furthermore, the pre-created message may be dynamically adjusted, in terms of the amount of "lateness" specified, based on the location comparison at step 66. For example, based on GPS data received by an in-dash navigation system, the step 66 comparison could be used to infer an approximate arrival time of 10:10 a.m. for the example meeting discussed above. The system would then prompt the user, along the following lines: "Would you like to send a message indicating you will be 10 minutes late?" If the user indicates his or her assent to the prompt (step 72), the method includes automatically preparing and sending the pre-created message (step 74).

The particular format and wording of the prompted lateness message may of course take any appropriate form, though in many cases it will be desirable that the user action required be minimal. For example, the assent at step 72 can be a simple voice command, a press of a single hard or soft button, etc. In addition, the automatic preparation and sending at step 74 may involve automatically sending the pre-created message to all of the meeting participants associated with the calendar item.

Optional step 76 and optional step 78 provide additional examples of fulfillment actions that can be issued/suggested in the event that the PIM item selected at step 64 is a calendar item having a scheduled time. Referring again to the example of the 10:00 a.m. meeting, the location comparison of step 66 may prompt the user to send a pre-created message to the other participant(s) suggesting an alternate location. This may occur for example, in response to the location comparison showing that the user's current location is outside a predetermined range of where the meeting is to occur (indicating for example, that the original location is unfeasible or that the user would arrive unacceptably late). Alternatively, location information associated with one or more other participants may be used to select an alternate location. Furthermore, as shown at step 78, the prompted user fulfillment action may be to propose a rescheduling of the meeting. As with step 76, the suggestion to send a rescheduling message may be based on the comparison location indicating that the user's current location is outside a predetermined range of where the meeting is to occur.

It should be further appreciated that traffic data, incident data, and the like may be provided along with or as part of the location data received by a user. In one example, traffic data may be used to predict arrival times to meetings or other scheduled calendar items. In the example above, data pertaining to congestion and/or traffic accidents can be received by the system and used in formulating/sending the predefined messages relating to arriving late, rescheduling, suggesting alternate locations, etc. Traffic and incident data can also be used to dynamically adjust reminders to the user. For example, heightened traffic flow could be used, independently or in combination with the user's current location, to dynamically adjust the time at which a meeting reminder is communicated to the user. In general, data pertaining to traffic, incidents, etc. may operate as an additional or alternative input to one or more of the operations/determinations depicted at step 62, step 64, step 66 and step 68.

Referring again to step 64, method 60 may be implemented so that the selected PIM item is a task item specifying a task the user is to perform. Often, a location will be associated with a task-type PIM item. For example, although tasks like "grocery shopping" or "renew driver's license" can be performed at various times, they are often associated with specific locations. Accordingly, if the comparison location at step 66 indicates the user is near a location where one of their tasks can be performed, the suggested fulfillment action may include prompting the user to perform the task, as shown at step 80. In addition, assuming the user responds affirmatively to such prompting, the method may include accommodating this newly-added or reordered action by shifting other scheduled items (e.g., meetings). Furthermore, this shifting or adjustment may be performed based on location data, and/or on data pertaining to traffic, incidents, etc.

In addition to prompting user action based on dynamic location information, the systems and methods described herein may be employed to aid a user in identifying PIM system information that may contain useful location information. Meetings are often scheduled in PIM systems without a location being specified. In other cases, meeting participants exchange communications after the meeting has been scheduled, in order to specify or change the meeting location. In fact, location-relevant communications are often sent shortly before a meeting is to begin.

Figure 4:
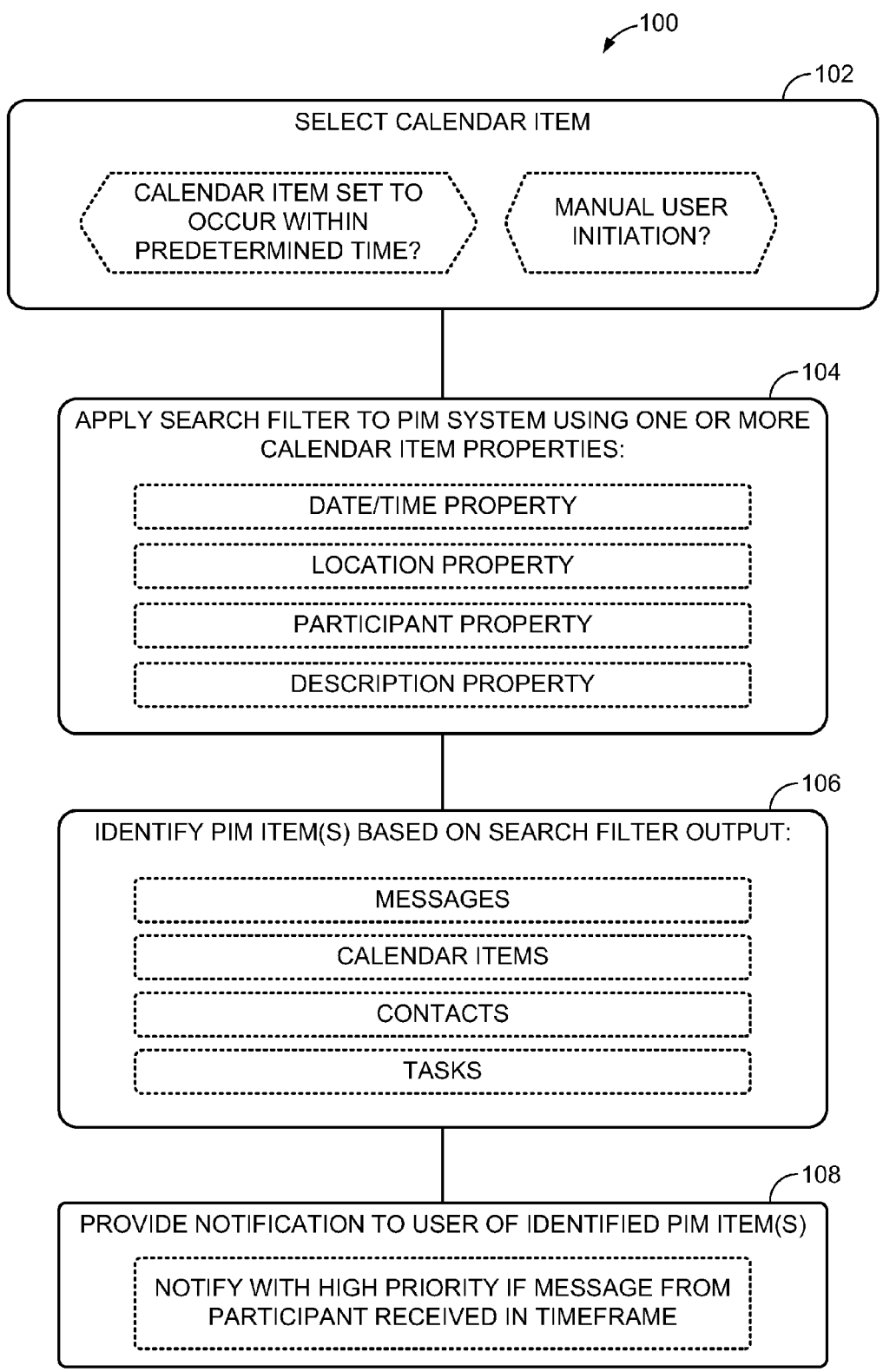
FIGS. 4-6 depict an exemplary method for identifying and acting upon location-relevant PIM items in a PIM system of a user.

FIG. 4 depicts an exemplary method 100 for identifying location-relevant information in a PIM system, such as PIM server 22. In many cases, for example, a PIM system user will need to find an address or other location information for an upcoming meeting. Accordingly, as shown at step 102, the method may include receiving a selection of a calendar item in the PIM system of a user. The selected calendar item typically includes, among other things, a date/time property, a location property, a participant property, and/or a description property. These properties may be thought of as attributes or characteristics of the calendar item. In some cases, the calendar item may have a null value for one or more of these properties. For example, as described above, meeting organizers will frequently not specify a location for a meeting when the calendar item is first introduced into the PIM system. In such a case, the location property would have a null value.

Once the calendar item is selected, the method includes automatically identifying location-relevant information for the calendar item. Typically, this includes a search for items in the user's PIM system that are likely to contain information of potential relevance to the location of the calendar item (e.g., the location where a meeting is to take place). Furthermore, the search for relevant items can include filtering incoming items or other items that are not yet stored in the user's PIM system. An example of this is to prospectively search for incoming messages from the organizer of a meeting during a period leading up to the meeting (e.g., a half hour prior to the meeting.) A message from the meeting organizer that is sent in this timeframe is likely (or may be deemed by the system to be likely) to involve a change or update to the meeting location. Accordingly, as discussed in more detail below, one example implementation of method 100 is to immediately identify such an incoming message and provide a high-priority notification to the user.

Accordingly, method 100 may further include applying a search filter to the user's PIM system using one or more of the properties of the calendar item, as shown at step 104. Then, at step 106, one or more PIM items are identified from the search filter output. The identified items may include various types of PIM items (messages, calendar items, contacts, tasks, etc.) that are identified as containing or including information that is potentially relevant to the location of the calendar item selected at step 102.

Steps 104 and 106 may be illustrated through various examples. In many cases, the location information sought by the user will be in a message in the user's PIM system. The search filter can look for messages from meeting participants (e.g., obtained from the participant property) with particular emphasis on the meeting organizer. Past appointments with one or more of the meeting participants can be retrieved, on the probability/possibility that the calendar item selected at step 102 will occur in the same place as one of the past appointments. Keywords from the description property of the calendar item can be matched against keywords from PIM items in the system. These are but a few examples, virtually limitless possibilities exist. Also, as indicated at step 106 and referenced in some of the above examples, the search may yield PIM items other than just messages—other calendar items, contacts, tasks, etc. may contain potentially relevant location information. As shown at step 108, the method may further include providing user notification of the identified PIM item or items.

Referring again to the example in which an organizer of a meeting sends an email, text message or other message in a short time window prior to a meeting, the selection may occur at step 102 automatically in response to detecting an upcoming calendar event. Returning again to the example of driving to a 10:00 a.m. meeting, the search filter of step 104 can be enabled automatically at a predetermined time before the meeting. For purposes of illustration in this example, assume the 10:00 a.m. meeting is selected a half hour prior, such that the search filter of step 104 is automatically enabled and begins searching at 9:30 a.m. for location-relevant PIM items. As previously indicated, in this situation a prospective filter might be desirable, so as to provide the driver with an urgent or other high-priority notification of a communication from the meeting organizer or another participant, as shown at step 108. In one example, the driver might have the system configured so that an in-dash navigation/PIM device provides an audible alert in the event of such a message.

In other example implementations of the method, the search and identification of step 104 and step 106 is applied to locate pre-existing PIM items in the user's system, as opposed to screening for high-priority incoming items. In this manner, the calendar item selected at step 102 acts as a search actuator, in the sense that the calendar item and its selection provide a mechanism for search initiation. Indeed, as shown at step 102, a manual user initiation may be employed to select the calendar item that actuates the search and identify actions of step 104 and step 106. In one example, the user simply selects a calendar item in their PIM system. Additionally, or alternatively, the visual representation of the calendar item or PIM user interface may include a button or other actuator for triggering the automatic search and identify functions.

Figure 5:
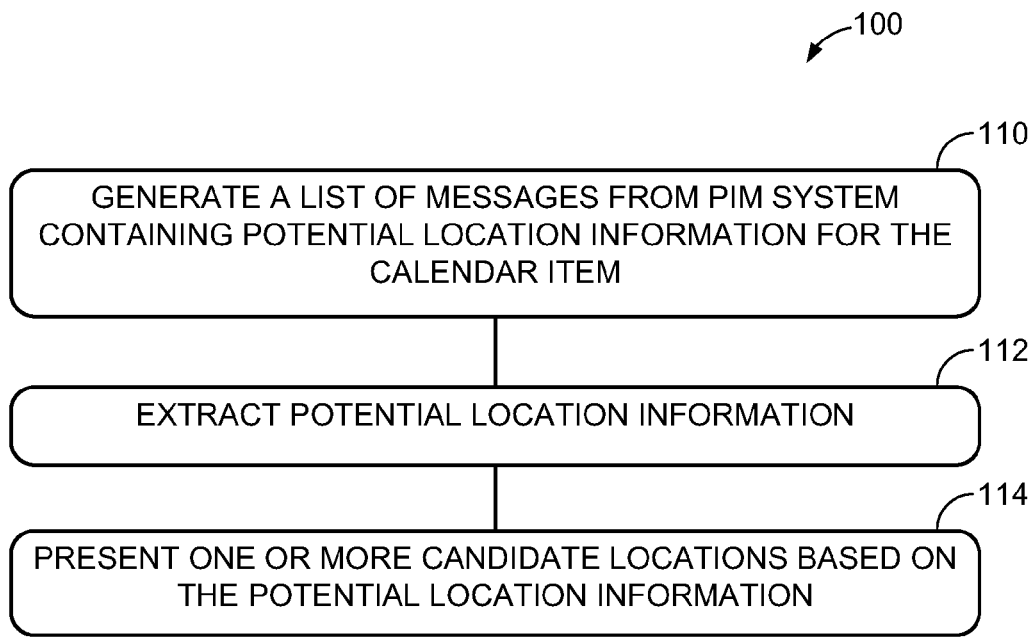

FIG. 5 depicts additional exemplary steps of method 100 that may be performed in addition to or in connection with the search and identify steps 104 and 106 of FIG. 4. In particular, as shown at step 110, the method may include generating a list of messages (e.g., emails) from the PIM system containing potential location information for the calendar item selected at step 102 of FIG. 4. At step 112, the method may include extracting potential location information from the list of messages, and at step 114, one or more candidate locations may be presented to the user based on the potential location information. The extracting at step 112 can include pulling text from identified messages based on known patterns of address information, for example. Referring to FIG. 1, the presenting of candidate locations may be performed by a navigation system, such as in-dash navigation system 36, in the form of one or more proposed destinations and/or routes.

Figure 6:
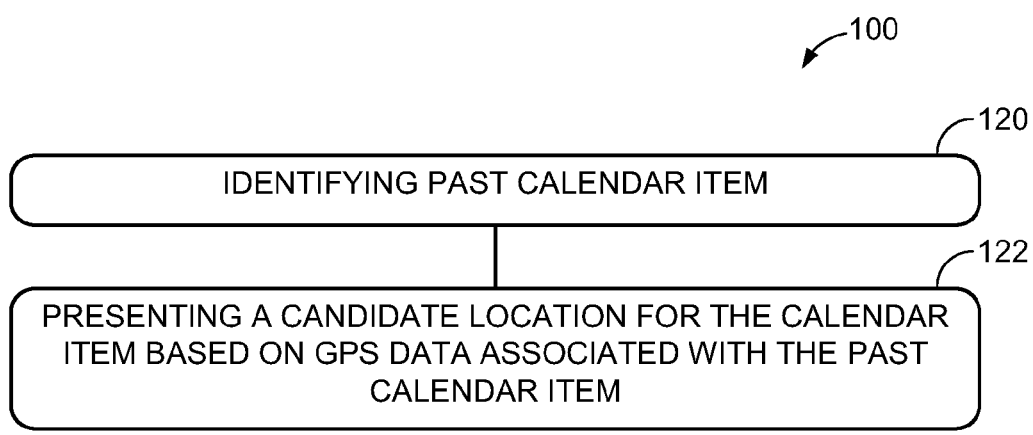

FIG. 6 depicts further exemplary steps of method 100 that may be performed in addition to or in connection with the search and identify steps 104 and 106 of FIG. 4. As shown at step 120 and step 122, the method may include identifying a past calendar item having associated GPS data, and presenting a candidate location for the calendar item (i.e., the calendar item selected at step 102 of FIG. 4) based on the associated GPS data.

Figure 7:
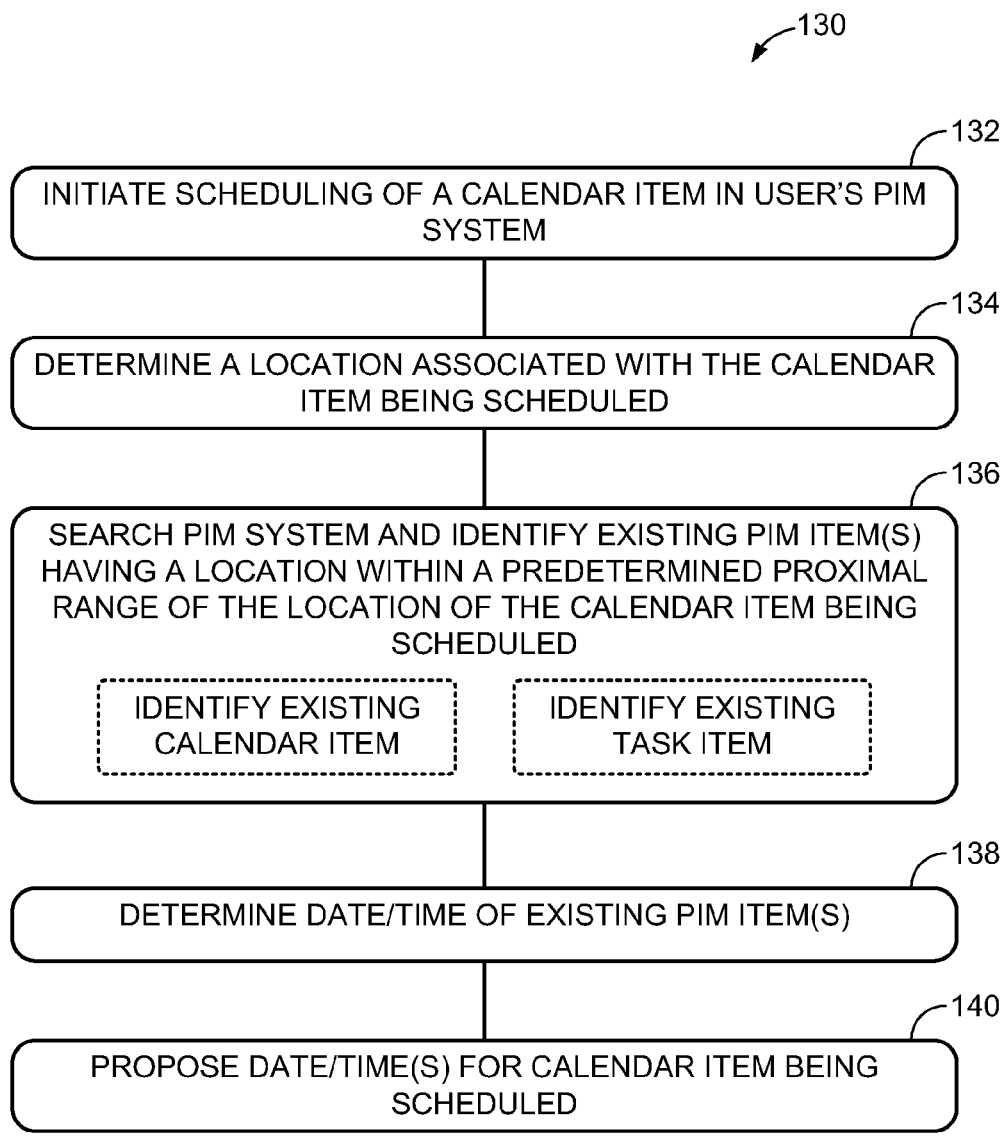
FIG. 7 depicts an exemplary method for scheduling a calendar item based on existing location information in a PIM system of a user.

Referring now to FIG. 7, an exemplary method 130 is depicted for scheduling calendar items based on locations of existing PIM items of a user. As shown at step 132, method 130 may include initiating scheduling of a calendar item in the user's PIM system. This may occur in various ways. In a desktop application, the user may begin entering text in appointment fields via the user interface of a client PIM application (e.g., from desktop computer 40 of FIG. 1). In another example, the user might be rescheduling while in their vehicle, such as after or in response to the example rescheduling step 78 (FIG. 3).

Regardless of the particular selection mechanism, the method continues at step 134 with determining a location associated with the calendar item being scheduled. The location may be determined via user entry or other methods. In the case of rescheduling, the location for the rescheduled meeting typically is known, and the known location would therefore be used at step 134.

At step 136, the method includes searching the PIM system and identifying one or more existing PIM items that have locations that are within a predetermined proximal range (e.g., distance) of the calendar item being scheduled. As indicated, the identified PIM item may be an existing calendar item or an existing task item, although other types of PIM items can be used as well. At step 138, the method includes determining a date/time—i.e., a day and/or time—of the PIM item or PIM items identified in step 136. For example, step 138 might that the user has a meeting at 3:00 p.m. on the following Wednesday, and that the meeting is less than a mile away from the location of the calendar item being scheduled. At step 140, the method includes proposing a date/time for the calendar item being scheduled. The proposed date/time is selected and proposed to the user based on it being conflict-free and within a desired time of the existing PIM item (e.g., on the same day, or within a predetermined amount of time before or after the time of existing item). In the above illustration, the proposed date/time could be selected to be adjacent the 3:00 p.m. meeting, for example. Furthermore, the determination and proposals described in the exemplary method may be made based on previously recorded data relating to location, traffic, incidents, etc., for example as received via a portable or in-dash navigation system.

As indicated, step 136, step 138 and step 140 may include identifying multiple existing PIM items having locations that are within a predetermined proximal range of the location of the calendar item being scheduled. In such a case, the method may further include proposing multiple proposed date/times for the calendar item being scheduled. Alternatively, even in the case of a single item being identified at step 136, the method may include proposing multiple options to the user for the date/time of the item being scheduled. Furthermore, in some cases it will be desirable to prioritize the multiple proposed date/times based on various criteria.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of identifying location-relevant information in a PIM system of a user, the method comprising:
   receiving a selection of a calendar item in the PIM system, wherein the calendar item includes a null value entered for a location;
   automatically identifying, by the PIM system, location-relevant information for the calendar item in the PIM system, said automatically identifying including:
      applying a search filter to an incoming message to the user from a participant associated with the calendar item; and
      identifying, based on output from the search filter, location-relevant information associated with the calendar item; and
   providing a notification to the user, the notification indicating the location-relevant information.

2. The method of claim 1, wherein the selection of the calendar item is made in response to the calendar item being set to occur less than a predetermined duration from a current time.

3. The method of claim 1, further comprising using the search filter to generate a list of messages from the PIM system containing potential location information for the calendar item.

4. The method of claim 3, further comprising extracting the potential location information from the list of messages.

5. The method of claim 4, wherein the notification includes one or more candidate locations for the calendar item based on the potential location information.

6. A method of scheduling calendar items based on locations of an existing PIM item in a PIM system of a user, the method comprising:
   initiating scheduling of a calendar item in the PIM system of the user;
   determining a location associated with the calendar item;
   searching the PIM system and identifying an existing PIM item that has a location within a predetermined proximal range of the location associated with the calendar item being scheduled;
   determining a scheduled date and time of the existing PIM item;
   from available conflict-free dates and times, selecting the conflict-free date and time closest to the scheduled date and time of the existing PIM item; and
   proposing to the user a proposed date and time for the calendar item being scheduled, the proposed date and time being the selected conflict-free date and time closest to the scheduled date and time of the existing PIM item.

7. The method of claim 6, wherein identifying an existing PIM item includes identifying multiple existing PIM items having locations within the predetermined proximal range of the location associated with the calendar item being scheduled, and wherein the method includes proposing to the user multiple proposed dates and times for the calendar item being scheduled.

8. The method of claim 7, further comprising prioritizing the multiple proposed dates and times for the calendar item being scheduled.

9. The method of claim 6, where selecting the conflict-free date and time closest to the date and time of the existing PIM item includes determining a date and time that is conflict-free and adjacent to the scheduled date and time of the existing PIM item.

10. A method of identifying location-relevant information in a PIM system of a user, the method comprising:
   receiving a selection of a calendar item in the PIM system;
   automatically identifying, by the PIM system, location-relevant information for the calendar item in the PIM system, said automatically identifying including:
      applying a search filter to one or more received messages, each of the one or more received messages being received by the user and originating from a participant associated with the calendar item; and
      identifying, based on output from the search filter, location-relevant information associated with the calendar item; and
   providing a notification to the user, the notification indicating the location-relevant information.

11. The method of claim 10, wherein the location-relevant information comprises a change in location from an original location specified in the PIM system for the calendar item to an updated location specified in at least one of the received messages.

12. The method of claim 10, wherein the calendar item does not specify a location prior to identifying the location-relevant information by the PIM system.

13. The method of claim 10, wherein automatically identifying location-relevant information for the calendar item in the PIM system further comprises retrieving past appointments with one or more participants associated with the calendar item, and applying the search filter to the past appointments.

* * * * *